(12) United States Patent
Maat et al.

(10) Patent No.: US 9,162,927 B2
(45) Date of Patent: Oct. 20, 2015

(54) PROCESS FOR PRODUCING METALLIC OR CERAMIC SHAPED BODIES

(75) Inventors: Johan ter Maat, Mannheim (DE);
Martin Blömacher, Meckenheim (DE);
Hans Wohlfromm, Mannheim (DE)

(73) Assignee: BASF SE (DE)

( * ) Notice: Subject to any disclaimer, the term of this patent is extended or adjusted under 35 U.S.C. 154(b) by 343 days.

(21) Appl. No.: 13/420,173

(22) Filed: Mar. 14, 2012

(65) Prior Publication Data

US 2012/0235330 A1    Sep. 20, 2012

Related U.S. Application Data

(60) Provisional application No. 61/453,149, filed on Mar. 16, 2011.

(51) Int. Cl.
*C04B 35/26* (2006.01)
*C04B 35/111* (2006.01)
(Continued)

(52) U.S. Cl.
CPC .............. *C04B 35/26* (2013.01); *B22F 3/1021* (2013.01); *B22F 3/1025* (2013.01); *B22F 3/225* (2013.01);
(Continued)

(58) Field of Classification Search
CPC ............ C04B 35/634; C04B 35/63488; C04B 35/638
USPC ................................................. 264/638, 645
See application file for complete search history.

(56) References Cited

U.S. PATENT DOCUMENTS 4,197,118 A    4/1980   Wiech, Jr.
5,145,900 A    9/1992   Sterzel et al.
(Continued)

FOREIGN PATENT DOCUMENTS

DE    4337129 A1    8/1994
DE   19925197 A1   12/1999
(Continued)

OTHER PUBLICATIONS

German, R.M., "Powder Injection Molding", MPIF, (1990), pp. 99-124.
(Continued)

*Primary Examiner* — Joseph S Del Sole
*Assistant Examiner* — Russell Kemmerle, III
(74) *Attorney, Agent, or Firm* — Drinker Biddle & Reath LLP

(57) ABSTRACT

A process for producing a metallic or ceramic shaped body from a thermoplastic material comprising
  A) 40 to 65% inorganic sinterable powder A
  B) 35 to 60% binder
    $B_1$) 50 to 95% polyoxymethylene homo- or copolymers;
    $B_2$) 5 to 50% of a polymer dissolved or dispersed in $B_1$) with a particle size of less than 1 μm,
    and
  C) 0 to 5% by volume of a dispersing aid,
by injection molding or extrusion to give a green body, removing the binder and sintering, which comprises removing the binder by
  a) treating the molding with a solvent which extracts the binder component $B_2$) from the molding and in which the binder component $B_1$) is insoluble,
  b) removing the solvent from the molding by drying, and
  c) treating the molding in an acid-containing atmosphere is described.

9 Claims, 1 Drawing Sheet

(51) Int. Cl.
*C04B 35/486* (2006.01)
*C04B 35/505* (2006.01)
*C04B 35/565* (2006.01)
*C04B 35/581* (2006.01)
*C04B 35/584* (2006.01)
*C04B 35/634* (2006.01)
*C04B 35/638* (2006.01)
*B22F 3/10* (2006.01)
*B22F 3/22* (2006.01)
*B28B 1/24* (2006.01)

(52) U.S. Cl.
CPC ............ *B22F 3/227* (2013.01); *C04B 35/111* (2013.01); *C04B 35/486* (2013.01); *C04B 35/505* (2013.01); *C04B 35/565* (2013.01); *C04B 35/581* (2013.01); *C04B 35/584* (2013.01); *C04B 35/638* (2013.01); *C04B 35/63408* (2013.01); *C04B 35/63424* (2013.01); *C04B 35/63444* (2013.01); *C04B 35/63452* (2013.01); *C04B 35/63456* (2013.01); *C04B 35/63488* (2013.01); *B22F 2998/10* (2013.01); *B22F 2999/00* (2013.01); *B28B 1/24* (2013.01); *C04B 2235/3225* (2013.01); *C04B 2235/5445* (2013.01); *C04B 2235/6022* (2013.01); *C04B 2235/77* (2013.01)

(56) References Cited

U.S. PATENT DOCUMENTS

| | | | |
|---|---|---|---|
| 5,198,489 A * | 3/1993 | Sterzel et al. | 524/439 |
| 5,362,791 A | 11/1994 | Ebenhoech et al. | |
| 5,604,919 A | 2/1997 | Sterzel et al. | |
| 5,611,978 A | 3/1997 | Truebenbach | |
| 6,051,184 A | 4/2000 | Kankawa | |
| 8,674,018 B2 * | 3/2014 | ter Maat et al. | 524/593 |
| 2003/0091456 A1 | 5/2003 | Bloemacher et al. | |
| 2005/0182176 A1 * | 8/2005 | Wohlfromm et al. | 524/439 |
| 2006/0099103 A1 * | 5/2006 | Wohlfromm et al. | 419/23 |
| 2009/0288739 A1 | 11/2009 | Wohlfromm et al. | |
| 2012/0294749 A1 * | 11/2012 | ter Maat et al. | 419/10 |
| 2013/0062820 A1 * | 3/2013 | ter Maat et al. | 264/645 |

FOREIGN PATENT DOCUMENTS

| | | |
|---|---|---|
| DE | 10019447 A1 | 10/2001 |
| EP | 0413231 A2 | 2/1991 |
| EP | 0444475 A2 | 9/1991 |
| EP | 0446708 A2 | 9/1991 |
| EP | 465940 A2 | 1/1992 |
| EP | 501602 A2 | 9/1992 |
| WO | WO-9425205 A1 | 11/1994 |
| WO | WO-2008/006776 A1 | 1/2008 |
| WO | WO-2011016718 A1 | 2/2011 |
| WO | WO 2012/123913 | 9/2012 |

OTHER PUBLICATIONS

International Search Report for PCT/IB2012/05137, mailing date Nov. 8, 2012.

Written Opinion of the International Searching Authority for PCT/IB2012/05137, completion date Oct. 15, 2012.

* cited by examiner

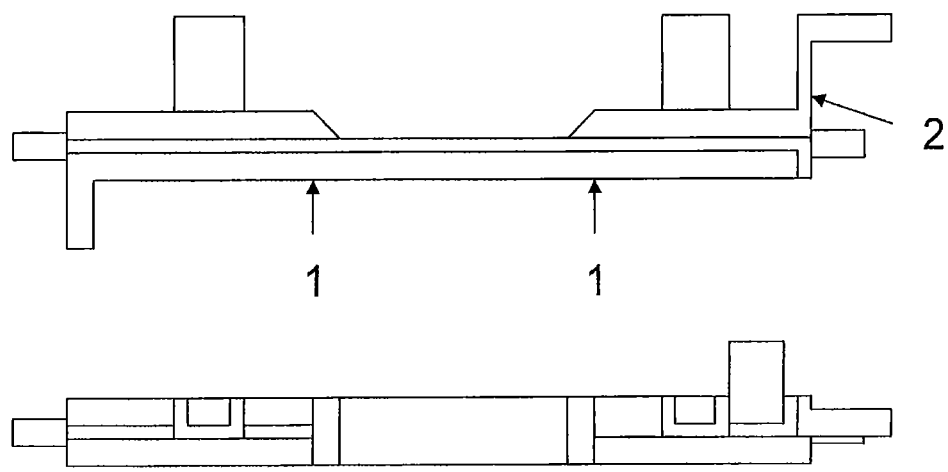

PROCESS FOR PRODUCING METALLIC OR CERAMIC SHAPED BODIES

CROSS-REFERENCE TO RELATED APPLICATION

This application claims the benefit of U.S. Provisional Application Ser. No. 61/453,149 filed Mar. 16, 2011, the entire contents of which are incorporated herein by reference in its entirety.

FIELD OF THE INVENTION

The present invention relates to a process for producing metallic or ceramic shaped bodies from thermoplastic molding compositions comprising pulverulent metals, pulverulent metal alloys or pulverulent ceramics, and organic binders.

BACKGROUND

Metallic or ceramic moldings can be produced by injection molding, extrusion or compression molding of thermoplastic compositions which, in addition to metal powders and/or ceramic powders, comprise an organic binder. These are organic polymer molding compositions with a high filler level. After the thermoplastic composition has been shaped to give a green part, the organic binder is removed and the resulting debindered green part (=brown part) is sintered.

The first binders for the powder injection molding process were based generally on mixtures of polyethylene or polypropylene and wax. In this case, the green body is first freed of the wax by melting and the residual binder is burnt out by slow pyrolysis. For the melting, the green parts have to be introduced into a powder bed because there is virtually no green strength as a result of the melting. Later binder systems for thermal debindering do not involve melting because the costly and inconvenient embedding of the green parts into powder and subsequent excavation are much too time-consuming.

Typically, an improved binder system for the complete thermal debindering consists of several components, as described, for example, in DE 1992 5197. These components are released gradually from the shaped bodies on heating at different temperatures, such that the typically relatively low binder constituent is still present up to at least 400° C. and can be considered to be residual binder. Purely thermal debindering takes 1 to 3 days and is thus extremely slow.

A still further-improved process is that of solvent debindering, in which binder systems which comprise binder components of different solubility are used. For debindering of the green part, one binder component is first removed by solvent extraction, after which the remaining residual binder component, which is insoluble or very sparingly soluble in the solvent, is in turn removed from the molding by a slow thermal decomposition (e.g. U.S. Pat. No. 4,197,118 or EP 501 602). In the course of this, the melting range of the residual binder is passed through and plastic deformation of the powder molding is unavoidable as a result.

WO 2011/016718 A1 describes a powder injection molding process in which a binder mixture of a polymer, for example POM, and a nonpolymeric solvent (molar mass<300 g/mol, melting point>RT) is used for the polymer. The aforementioned solvent is first leached out or else evaporated. The remaining polymer is removed by thermal debindering. A disadvantage in this process is that such binders, when mixed with powder and when processed in an injection molding machine, already vaporize the nonpolymeric solvent. The low molecular weight component is sweated out at the green part surface and soils the injection mold. Furthermore, the green part strength is distinctly reduced.

R. M. German writes, in his handbook "Powder Injection Molding", MPIF 1990, Chapter 4, page 115, about solvent debindering:

"The two constituents in the binder are often present in roughly equal proportions. This allows each to remain interconnected throughout the pore structure between the particles. The binder interconnectivity can be easily maintained with as little as 30 volume percent of either constituent. Successful binder formulations therefore contain 70 to 30% by volume of a major component."

A further process for debindering the green part according to the prior art is based on catalytic debindering by treatment of the green part in a gaseous acid-containing atmosphere at elevated temperature. EP-A 0 413 231 discloses, for example, a process for producing an inorganic sintered molding, in which a mixture of a sinterable inorganic powder and polyoxymethylene as a binder is shaped to a green body, and the binder is then removed by treating the green body in a gaseous, acid-containing, for example boron trifluoride- or $HNO_3$-comprising, atmosphere. Subsequently, the green body thus treated is sintered. Examples of sinterable powders are both oxidic ceramic powders such as $Al_2O_3$, $ZrO_2$, $Y_2O_3$, and nonoxidic ceramic powders such as SiC, $Si_3N_4$ and metal powders.

With a binder phase consisting exclusively of POM, however, satisfactory results are not obtained in practice since the sinter densities are too low.

EP-A 0 444 475 describes binder compositions which are suitable for ceramic shaped bodies and comprise, as well as polyoxymethylene, poly-1,3-dioxolane, poly-1,3-dioxane or poly-1,3-dioxepane as an additional soluble polymer, or aliphatic polyurethanes, aliphatic polyepoxides, poly($C_2$-$C_6$-alkylene oxides), aliphatic polyamides or polyacrylates, or mixtures thereof, as a polymer dispersible in POM.

EP 0 465 940 A1 and DE 100 19 447 A1 describe thermoplastic molding compositions for the production of metallic shaped bodies, which comprise, in addition to a sinterable pulverulent metal or a pulverulent metal alloy, a mixture of polyoxymethylene homo- or copolymers and a polymer immiscible therewith as a binder. Useful additional polymers include polyolefins, especially polyethylene and polypropylene, and also polymers of methacrylic esters such as PMMA (EP 0 465 940 A1). DE 100 19 447 A1 describes binders for inorganic material powders for production of metallic and ceramic shaped bodies, these binders comprising a mixture of polyoxymethylene homo- or copolymers and a polymer system composed of polytetrahydrofuran and at least one polymer formed from $C_{2-8}$-olefins, vinylaromatic monomers, vinyl esters of aliphatic $C_{1-8}$-carboxylic acids, vinyl $C_{1-8}$-alkyl ethers or $C_{1-12}$-alkyl(meth)acrylates.

WO 2008/006776 A1 describes binders for inorganic material powders for production of metallic shaped bodies, these binders being a mixture of polyoxymethylene homo- or copolymers and a polymer system formed from $C_{2-8}$-olefins and poly-1,3-dioxepane or poly-1,3-dioxolane.

When the aforementioned POM binder systems are used, the green parts are debindered catalytically by treatment of the green part in a gaseous acid-containing atmosphere of, for example, hydrogen halides, formic acid or nitric acid at elevated temperature. This depolymerizes the polyoxymethylene homo- or copolymers without residue, followed by a slow thermal residual debindering of the remaining polymer. Here too, the melting range of the residual binder is passed through and plastic deformation of the powder molding is unavoidable as a result. The residual binder content in the case of catalytic removal is generally about 10%. Owing to the lower residual binder content, plastic deformation is typically less marked than in the case of solvent debindering, where the residual binder content is typically 30 to 70%.

In the case of reactive powder surfaces, catalytic debindering with the aforementioned acids, especially with nitric acid, can cause problems as a result of a reaction of the acid with the surface. This reaction may be so pronounced that the debindering stops as a result of pore blockage after a penetration depth of a few tenths of a millimeter. For example, $HNO_3$ debindering in the case of copper and copper-containing alloys is impossible or, in the case of a low Cu content, possible only to a limited degree because the voluminous nitrates block access to the molding interior. Similar behavior is known from cobalt.

However, experience has shown that problems do also occur in the case of other metals where no reaction with $HNO_3$ is obvious and the debindering proceeds completely normally. In these cases, possibly only a surface reaction takes place and the debindering rate is adversely affected to a barely noticeable degree, if at all. Nevertheless, in the sintered product, an increase in the oxygen content is found, for example in the case of titanium, or a loss of carbon in the case of carbon-containing alloys, for example of iron, as a result of the reaction to give gaseous carbon oxides.

Further examples of powders in which there is no directly obvious occurrence of reactions with $HNO_3$ are W, V, Mg, Mn, and ceramic powders such as AlN and $Si_3N_4$. Especially in the case of alloys comprising reactive metals, for example Al- and/or Ti-containing superalloys such as IN713C, MAR 246, GMR 235 and IN 100, such surface reactions are not disruptive for the progress of debindering, but the Al- and Ti-containing oxide layers resulting therefrom are no longer reducible later in the sintering step, and these alloy elements are then unavailable or only partly available for the alloy formation; the material properties of the sintered product are worse or even unusable.

Catalytic debindering with oxalic acid, even for oxidation-sensitive sinter materials such as WC/Co and Cu, is described in WO 94/25205. However, catalytic debindering with oxalic acid in direct comparison with $HNO_3$ is much slower, and the metering of oxalic acid in solid form is problematic, and so there has been no industrial use thereof to date.

All available literature about powder injection molding from the last 30 years thus states that the organic binder must consist of several components; in general, there are at least two components, of which one component is removed in a first debindering step and a second component remains in the molding as residual binder.

The function and importance of this residual binder, called "backbone", is explained by the fact that the backbone must ensure basic strength in the brown part in order to enable the transport of the brown parts (for example to quality control tests, or from the debindering furnace to the sinter furnace). In addition, the residual binder during the early stage of the sintering operation should guarantee that the moldings are intact, since the diffusion processes which lead at first to contact formation between the powder particles and later to densification typically set in only at approx. 600-1000° C. Below this temperature, a debindered molding without residual binder would correspond to a pure packing of powder particles, effectively a sandcastle, without any strength.

R. M. German writes, in his handbook "Powder Injection Molding", MPIF 1990, Chapter 4, page 99: "The binder is a temporary vehicle for homogeneously packing the powder into the desired shape and then holding the particles in that shape until the beginning of sintering."

The content of the residual binder varies from approx. 10 to a maximum of 70% by weight of the binder phase, the content being dependent on the primary debindering method selected and the polymer type.

According to the prior art, the residual binder is removed without exception by thermal decomposition. The temperature at which the residual binder leaves the brown part depends on the polymer selected and on the selection of the furnace protective gas, but is typically within the temperature range of 300 to 600° C., especially 400 to 500° C.

A disadvantage of the customary thermal residual debindering is that this is an original source for unwanted reactive substances. During the thermal residual debindering, polymer chains are typically cracked and split up into shorter chains. In many polymers, carbon forms as a by-product, and this carbon is very finely distributed and reactive. This reactive carbon can in turn be bound by the reactive metals or alloy elements and form further unwanted secondary phases (carbides).

The residual binder is also a considerable disadvantage for the operation of the sinter furnace, the heating rate of which always has to take account of the thermal decomposition of the residual binder, and problems often exist with the control of the carbon content as a result of carbonization of the residual binder.

The sinter furnace accordingly has to fulfill a particular task within one temperature range (300 to 600° C.) where the control of the furnace is difficult; in terms of power release, the sinter furnaces are designed for the high-temperature range above 1200° C. Since sinter furnaces, especially batch sinter furnaces for MIM, are very expensive due to the molybdenum used, it would be an important cost advantage to not have to pay any attention to thermal decomposition. The higher heating rate possible without residual binder could reduce the cycle time by 20 to 40%.

A further disadvantage is that the sinter furnace is affected by decomposition products of the residual binder, which have to be conducted out of the furnace by complex constructions and usually have to be condensed out, which causes considerable maintenance work.

BRIEF SUMMARY

It is therefore an object of the present invention to develop an improved process for production of metallic or ceramic shaped bodies, which enables provision of an essentially residual binder-free molding which can be sintered without the aforementioned restrictions and is also suitable for reactive powders.

The object is achieved by effecting the debindering in two steps, leaching a first binder component out of the green part with a solvent in a first debindering step, and removing the remaining binder component under acid catalysis in a second debindering step.

The invention provides a process for producing a metallic or ceramic shaped body from a thermoplastic material comprising A) 40 to 65% by volume of at least one inorganic sinterable powder A B) 35 to 60% by volume of a mixture of $B_1$) 50 to 95% by weight of one or more polyoxymethylene homo- or copolymers;

$B_2$) 5 to 50% by weight of a polymer homogeneously dissolved in $B_1$) or dispersed in $B_1$) with a mean particle size of less than 1 µm, as a binder, and C) 0 to 5% by volume of a dispersing aid, where the sum of components A), B) and C) adds up to 100% by volume, by injection molding or extrusion to give a green body, removing the binder and sintering, which comprises removing the binder by a) treating the molding with a solvent which extracts the binder component $B_2$) from the molding and in which the binder component $B_1$) is insoluble, b) then removing the solvent from the molding by drying, and c) then treating the molding in an acid-containing atmosphere which removes the binder component $B_1$ from the molding.

BRIEF DESCRIPTION OF THE DRAWING

FIG. 1 shows an elevation of the component at the top and a top view of the component at the bottom.

DETAILED DESCRIPTION OF THE PREFERRED EMBODIMENTS

The polyoxymethylene homo- or copolymers (POM) are known and commercially available as such. The homopolymers are prepared typically by polymerizing formaldehyde or trioxane, preferably in the presence of suitable catalysts. Polyoxymethylene copolymers preferred in the context of the invention likewise comprise trioxane and other cyclic or linear formals, or other formaldehyde sources, as main monomers. The term "main monomers" is intended to express the fact that the proportion of these monomers in the total amount of monomers, i.e. the sum of main monomers and comonomers, is greater than the proportion of comonomers in the total amount of monomers. Quite generally, such POM polymers have at least 50 mol % of repeat —$CH_2O$— units in the main polymer chain. Suitable polyoxymethylene copolymers are described in EP-A 0 446 708 (page 3, line 39 to page 4, line 31).

The proportion of component $B_1$) is preferably 50 to 95% by weight, more preferably 70 to 90% by weight, based on the total amount of binder B).

The proportion of component $B_2$) is preferably 5 to 50% by weight, more preferably 10 to 30% by weight, based on the total amount of binder B).

Suitable components $B_2$) are in principle polymers which are homogeneously soluble in polyoxymethylene homo- or copolymers $B_1$) or are dispersible therein in the particle size required.

Preferred polymers $B_2$) of this kind are polyolefins, aliphatic polyurethanes, aliphatic uncrosslinked polyepoxides, polyethers, aliphatic polyamides and polyacrylates, and mixtures thereof. The aforementioned preferred polymers $B_2$) are likewise described in EP-A 0 446 708 (page 4, line 34 to page 7, line 12).

Particularly preferred among the aforementioned polymers $B_2$) are polyethers, especially poly-($C_2$-$C_6$)-alkylene oxides such as polyethylene oxide (PEO), polypropylene oxide, poly-1,3-dioxepane (PDP), poly-1,3-dioxolane and polytetrahydrofuran, or mixtures thereof, preferably with mean molecular weights (weight average) in the range from 600 to 50 000 g/mol, more preferably 2000 to 30 000 g/mol, most preferably 5000 to 20 000 g/mol. Corresponding products are commercially available, or the corresponding preparation processes are known to those skilled in the art, and so there is no need for any further details here. It is also possible to use mixtures of different polyethers and/or polyethers of different molecular weights.

The inorganic sinterable powder A can be selected from all known suitable inorganic sinterable powders, especially also reactive and/or oxidation-sensitive powders. It is preferably selected from metal powders, metal alloy powders, metal carbonyl powders, ceramic powders and mixtures thereof, particular preference being given to metallic powders.

Examples of metals which may be present in powder form include aluminum, iron, especially iron carbonyl powder, chromium, cobalt, copper, nickel, silicon, titanium, tungsten, and representatives of the rare earths such as Nd, Sm and Y. Examples of pulverulent metal alloys include high- or low-alloy steels and metal alloys based on aluminum, iron, titanium, copper, nickel, tungsten or cobalt. It is possible to use either powders of already finished alloys or powder mixtures of the individual alloy constituents. The metal powders, metal alloy powders and metal carbonyl powders can also be used in a mixture. Suitable inorganic powders are also oxidic ceramic powders such as $Al_2O_3$, $ZrO_2$, $Y_2O_3$, but also nonoxidic ceramic powders such as SiC, $Si_3N_4$, and more complex oxide powders such as $NiZnFe_2O_4$, and also inorganic color pigments such as $CoAl_2O_4$. The reactive and oxidation-sensitive powders include especially those of copper, cobalt, Ti, W, V, Mg, Mn, Nd, Sm, Y and alloys thereof, ceramic powders such as AlN and $Si_3N_4$ and alloys of aluminum and/or titanium, so-called superalloys such as IN713C, MAR 246, GMR 235 and IN 100, and the alloys known from magnet technology with the main constituents Nd—Fe—B and Sm—Co.

The particle sizes of the powders are preferably 0.1 to 50 μm, more preferably 0.3 to 30 μm. The metal powders, metal alloy powders, metal carbonyl powders, ceramic powders can also be used in a mixture.

Any dispersing aid present as component C) may be selected from known dispersing aids. Examples are oligomeric polyethylene oxide with a mean molecular weight of 200 to 600, stearic acid, stearamide, hydroxystearic acid, fatty alcohols, fatty alcohol sulfonates and block copolymers of ethylene oxide and propylene oxide, and also polyisobutylene. Particular preference is given to using the dispersing aid in an amount of 1 to 5% by volume, based on components A), B) and C).

In addition, the thermoplastic compositions may also comprise customary additives and processing aids which favorably influence the rheological properties of the mixtures in the course of shaping.

The thermoplastic composition used in the process according to the invention can be produced in a customary manner in a kneader or extruder at temperatures of 150 to 200° C. (cf. EP-A-0413231). After cooling the composition, it can be granulated. In a preferred embodiment, the thermoplastic composition to be shaped can be produced by melting components B) and mixing in components A) and optionally C). For example, component B) can be melted in a twin-screw extruder at temperatures of preferably 150 to 220° C., especially 170 to 200° C. Component A) is subsequently metered into the melt stream of component B) in the required amount at temperatures within the same range. Advantageously, component A) comprises the dispersing aid(s) C) on the surface. However, the thermoplastic compositions can also be produced by melting components B) and C) in the presence of component A) at temperatures of 150 to 220° C.

For the shaping of the thermoplastic molding composition by injection molding, it is possible to use the customary screw and piston injection molding machines. The shaping is effected generally at temperatures of 175 to 200° C. and pressures of 3000 to 20 000 kPa in molds having a temperature of 60 to 140° C.

In the process according to the invention, the demolded green bodies are then treated with a solvent according to step a). The selection of the solvent is guided by the chemical nature of the binder component $B_2$). Hereinafter, solvents are specified merely by way of example for some binder components $B_2$); the solvents for other binder components $B_2$) should be known to those skilled in the art. It is also possible to use mixtures of suitable solvents.

Polyolefins are preferably dissolved in apolar solvents, for example pentane, hexane, cyclohexane, octane or benzine, and also in aromatic solvents such as benzene.

Polyacrylates (e.g. PMMA) and polyamides are generally soluble in the following solvents: ethers such as diethyl ether or tetrahydrofuran, ketones such as methyl ethyl ketone or acetone, esters such as butyrolactone, and $C_1$-$C_4$-alcohols such as ethanol.

Polyethers such as polytetrahydrofuran, poly-1,3-dioxepane, poly-1,3-dioxolane, polyethylene oxide or polypropylene oxide can be dissolved, for example, in solvents such as tetrahydrofuran or acetone, and in $C_1$-$C_6$-alcohols such as ethanol and isopropanol; polyethylene oxide could additionally be dissolved in water.

If water can be used as a solvent for the binder component $B_2$) it is particularly preferred, since water enables much simpler and more environmentally compatible handling due to noncombustibility.

For reactive and/or oxidation-sensitive sinter powders A, in the case of use of water as a solvent, a customary corrosion inhibitor is preferably added thereto, for example modified phosphonates such as aminotris(methylenephosphonic acid), hydroxyethylaminodi(methylenephosphonic acid) or phosphonobutane-1,2,4-tricarboxylic acid, obtainable, for example, from Zschimmer & Schwarz.

Exceptionally reactive sinter powders A are preferably treated with aprotic organic solvents such as ethers, esters, amides or ketones, for example tetrahydrofuran, diethyl ether, butyrolactone, dimethylformamide, methyl ethyl ketone or preferably acetone.

The treatment of the molding with a solvent in step a) of the process according to the invention can be performed in customary equipment with a closed solvent circuit for the cleaning of processed workpieces contaminated with lubricant, described by way of example in DE-A 4337129. In order to accelerate the dissolution operation, step a) is preferably effected at elevated temperature, i.e. a temperature above room temperature up to the boiling temperature of the solvent, especially at a temperature of 40 to 120° C. Particular preference is given to effecting step a) at boiling temperature of the solvent under reflux.

The polyoxymethylene homo- and copolymers (POM) used as binder component $B_1$) or second binder for step a) of the process according to the invention are resistant to virtually all common solvents up to 120° C. and still guarantee very high stability even at higher temperatures up to 120° C.

It is advantageous if a great concentration difference between the soluble binder component $B_2$) in the molding and the solvent exists in the extraction in step a) of the process according to the invention. The latter can be achieved by exchanging the laden solvent frequently for fresh solvent and/or conducting the dissolved extract rapidly away from the surface of the extraction material, for example by circulation.

The treatment with a solvent according to step a) of the process according to the invention is preferably performed until the binder component $B_2$) has been removed from the molding at least to an extent of 75%, preferably to an extent of 85%, more preferably to an extent of 90%. This state is attained generally after 4 to 30 hours. The treatment time required depends on the treatment temperature, on the quality of the solvent for the binder component $B_2$, on the molecular weight of component $B_2$, and on the size of the shaped body.

After the extraction, the green parts, which are now porous and solvent-saturated, still have to be dried according to step b) of the process according to the invention. The drying is accomplished in a conventional manner, for example with the aid of a vacuum drying oven or on a heating cabinet. The drying temperature is guided by the boiling temperature of the solvent, but should be selected somewhat lower in order to avoid the risk of an abrupt or excessively rapid drying operation with possible adverse consequences for the quality of the green part. Typically, the drying is complete within 0.5 to 8 h.

The acid treatment in step c) of the process according to the invention is effected preferably at temperatures in the range from 80 to 180° C. over a period of preferably 0.1 to 24 hours, more preferably 0.5 to 12 hours. The treatment time required depends on the treatment temperature, the concentration and type of the acid in the treatment atmosphere, and the size of the shaped body. Under the customary conditions, the result is generally an acid concentration of approx. 4 to 5% by volume in the atmosphere (generally nitrogen). In order to perform the catalytic debindering in a particularly gentle manner, it may be advantageous to reduce the amount of acid, resulting in a content of approx. 0.1 to 1% by volume.

Suitable acids for the treatment in step c) of the process according to the invention are, for example, inorganic acids which are already gaseous at room temperature, or at least are evaporable at the treatment temperature. Examples are hydrohalic acids and nitric acid. Suitable organic acids are formic acid, acetic acid or trifluoroacetic acid. Further suitable acids are $BF_3$ or adducts thereof with organic ethers.

If a customary carrier gas (inert gas, e.g. nitrogen) is used for the aforementioned acids, it is generally passed through the acid beforehand and laden therewith. The carrier gas thus laden is then brought to the treatment temperature, which is appropriately higher than the loading temperature in order to prevent condensation of the acid. The acid is preferably mixed into the carrier gas by means of a metering device and the mixture is heated to such an extent that the acid can no longer condense.

Further suitable and preferred acids for the treatment in step c) of the process according to the invention, especially for reactive and/or oxidation-sensitive sinterable powders A, are those acids which are solid at room temperature and sublime or melt and evaporate at higher temperatures, preferably including those having a sublimation or melting point between 80 and 200° C. Particular preference is given to oxalic acid, preferably anhydrous oxalic acid, or oxalic acid dihydrate. Preference is given to using a solution of anhydrous oxalic acid in formic acid, acetic acid or mixtures thereof.

Glyoxalic acid is additionally suitable. Options also include benzenesulfonic acid, naphthalenesulfonic acids and maleic acid, or mixtures thereof. These can be used in the debindering either alone or else together with a carrier gas such as air, nitrogen or a noble gas.

In the latter embodiment, the acids used are generally first converted to the gas phase at the debindering temperature, act on the remaining binder from the gas phase and desublime or solidify after cooling on the walls of the debindering apparatus. In a subsequent debindering operation, they are converted back to the gas phase, which means that the acid effectively does not leave the apparatus.

To facilitate the metered addition, it may be appropriate to use the abovementioned acids which are solid at room temperature and sublime or melt and evaporate at higher temperatures in the form of a solution in polar solvents, preferably with boiling points below 200° C. Useful such polar solvents include in particular acetone, dioxane, ethanol and acetonitrile, but especially organic acids such as formic acid and/or acetic acid.

The acid treatment in step c) of the process according to the invention is effected, in the variant with acids which are solid at room temperature and sublime or melt and evaporate at higher temperatures, preferably at temperatures in the range from 100 to 160° C.

The acid treatment in step c) of the process according to the invention is preferably performed until the residual binder content in the molding is less than 0.5% by weight, preferably less than 0.3% by weight, most preferably less than 0.2% by weight.

The acid treatment in step c) of the process according to the invention is often also referred to as catalytic debindering and can likewise be executed in commercial equipment which works by the principles as described in EP-A 0 413 231.

The product which has thus been freed of the binder by the process according to the invention can typically be converted by sintering to the desired shaped bodies, especially metallic or ceramic shaped bodies. The sintering can optionally be effected with an accelerated heating rate of 5 to 10° C./min within the temperature range from 200 to 600° C.

The process according to the invention can also debinder green parts of reactive metallic or ceramic powders virtually without residue, as a result of which the shaped bodies obtained by the process according to the invention have better material properties. The process according to the invention additionally enables shortened cycle times in the sinter furnace and reduces the maintenance requirement thereof.

The invention is illustrated in detail hereinafter by examples:

In the examples which follow, test compositions were homogenized in a conical mixer and homogenized and pelletized in a laboratory extruder heated to 190° C.

EXAMPLE 1

Molding composition 1 had the following composition:

56.75% by volume of a mixture of 98% by weight of iron carbonyl powder and 2% by weight of nickel carbonyl powder
43.25% by volume of binder comprising
+ 90% by weight of polyoxymethylene with 2 mol % of 1,3-dioxepane + 10% by weight of polyethylene oxide with a molar mass of 2000, end group-capped by methylation

EXAMPLE 2

Molding composition 2 had the following composition:

56.75% by volume of a mixture of 98% by weight of iron carbonyl powder and 2% by weight of nickel carbonyl powder
43.25% by volume of binder comprising
+ 80% by weight of polyoxymethylene with 2 mol % of 1,3-dioxepane + 20% by weight of polyethylene oxide with a molar mass of 2000, end group-capped by methylation

EXAMPLE 3

Molding composition 3 had the following composition:

56.75% by volume of a mixture of 98% by weight of iron carbonyl powder and 2% by weight of nickel carbonyl powder
43.25% by volume of binder comprising
+ 50% by weight of polyoxymethylene with 2 mol % of 1,3-dioxepane + 50% by weight of polyethylene oxide with a molar mass of 2000, end group-capped by methylation

EXAMPLE 4

Molding composition 4 had the following composition:

56.75% by volume of a mixture of 98% by weight of iron carbonyl powder and 2% by weight of nickel carbonyl powder
43.25% by volume of binder comprising
+ 90% by weight of polyoxymethylene with 2 mol % of 1,3-dioxepane + 10% by weight of polytetrahydrofuran having a molar mass of 2000

EXAMPLE 5

Molding composition 5 had the following composition:

64% by volume of a metal powder of the composition 17-4PH (DIN 1.4542) with a mean particle size of 7 μm
36% by volume of binder comprising
+ 80% by weight of polyoxymethylene with 2 mol % of 1,3-dioxepane + 20% by weight of polyethylene oxide with a molar mass of 2000, end group-capped by methylation

EXAMPLE 6

Molding composition 6 had the following composition:

47% by volume of a ceramic powder of the composition $ZrO_2$ –
 5% by weight of $Y_2O_3$ with a mean particle size of 0.3 μm 51% by volume of binder comprising
 + 80% by weight of polyoxymethylene with
 2 mol% of 1,3-dioxepane + 20% by weight of
 poly-1,3-dioxepane having a molar mass of 34000

2% by volume of dispersant, an ethoxylated fatty
 alcohol with a molar mass of 500

Injection Molding Tests on Real Components

The examination of the general suitability of the molding compositions for practical purposes was conducted with a complex and heavy component (FIG. 1), a hinge of complex geometry injection-molded with two film gates at positions 1.

FIG. 1 shows an elevation of the component at the top and a top view of the component at the bottom, position 1 indicating the film gate and position 2 the fracture site due to the part's own weight.

The length of the component was 100 mm; the weight of the sintered part obtained in the metal powder examples 1 to 5 was approx. 34 g; in example 6 approx. 26 g.

It is thus ensured that the results of the tests are also relevant in practice, since this component's own weight makes above-average demands on strength after debindering.

Study of Processing on Infection Molding Machine

Molding compositions 1 to 5 were melted in the barrel of the injection molding machine at 190° C.; the injection mold was heated to 135° C. The ceramic molding composition 6 was processed at barrel temperature 175° C. In general, the injection pressure required was approx. 1900 bar; only molding composition 3 with a high PEO content and the lower molar mass of 2000 could be processed at 1100 bar.

Molding compositions 1 to 6 differ in the cooling time required before demolding. The molding compositions with a higher proportion of secondary binder (20% or higher) were somewhat softer and required a longer cooling time to be able to demold the green part intact.

The processing of all molding compositions 1 to 6 was possible without any particular problems.

Study of Debindering and of Sintering

The green parts produced from molding compositions 1 to 6 were pretreated in a solvent, then catalytically debindered and sintered.

For the solvent debindering, the green parts were treated in a three-neck flask with a boiling solvent under reflux while stirring. Green parts of examples 1 to 4 were removed after storage for 7 h, 14 h, 21 h and 28 h in the solvent, dried and weighed. The green parts from examples 5a and 6 were reweighed only at the end of the storage (28 h).

Table 1 shows the results with regard to weight loss as a percentage of theory for the solvent primary debindering with acetone:

TABLE 1

| | Binder composition | Weight loss of the molding (% of theory) Treatment with acetone in hours | | | |
|---|---|---|---|---|---|
| Example | (% by weight) | 7 h | 14 h | 21 h | 28 h |
| 1 | POM - 10% PEO 2000 | 59 | 77 | 84 | 89 |
| 2 | POM - 20% PEO 2000 | 70 | 85 | 92 | 95 |
| 3 | POM - 50% PEO 2000 | 71 | 85 | 94 | 97 |
| 4 | POM - 10% PTHF 2000 | 69 | 81 | 85 | 88 |
| 5a | POM - 20% PEO 2000 | | | | 90 |
| 6 | POM - 20% PDP 34 000 | | | | 84 |

It is evident that the maximum debindering rate in the boiling solvent is attained at a binder content of only 20% by weight of component $B_2$) in the molding composition; example 3 with the highest PEO content in the molding composition is not significantly faster with regard to the dissolution operation. Even at 10% by weight of component $B_2$) in the molding composition (example 1), the removal is still astonishingly efficient.

In the case of the molding composition of example 6, the percentage weight loss was based on the total amount of poly-1,3-dioxepane plus dispersant.

Further green parts made from molding composition 5 were debindered according to example 5b in water as a solvent (see table 2):

Table 2 shows that the removal of the PEO binder content present in the molding is also possible in boiling water, although more slowly than in acetone.

TABLE 2

| | Binder composition | Weight loss of the molding (% of theory) Treatment with water in hours | | | |
|---|---|---|---|---|---|
| Example | (% by weight) | 7 h | 14 h | 21 h | 28 h |
| 5b | POM - 20% PEO 2000 | 54 | 67 | 72 | 75 |

The catalytic acid debindering which follows the primary debindering with a solvent was conducted with the components of examples 1 to 6 in a 50 l laboratory oven at 110° C. It was purged with 500 l/h of nitrogen for inertization; after 1 h, 30 ml/h of $HNO_3$ were metered into the oven which was still being purged with 500 ml/h of nitrogen, and vaporized. After 6 h of debindering time, the polyacetal content had been removed to an extent of at least 98% from all components.

The powder moldings of examples 5a and 5b were not entirely perfect: the arm on the right (position 2 in FIG. 1) on the elevation of the FIGURE have broken off. By reducing the acid dosage to 15 ml/h with 8 h of acid treatment time for slower, even more gentle debindering, intact, fully debindered moldings were obtained.

The powder moldings of examples 1 to 4 obtained after the two-stage debindering were sintered in 30 l sinter furnace with molybdenum lining and molybdenum sintering elements under nitrogen.

The sintering curve was as follows:
room temperature to 600° C. at 3° C./min
hold time at 600° C.: 1 h
600° C. to 1280° C. at 5° C./min
hold time at 1280° C.: 1 h
cooling at 5° C./min to 1000° C.
oven off, natural cooling.

With this standard sintering program for brown parts containing residual binder, it was possible for all molding compositions according to examples 1 to 4 to achieve a good sinter density of at least 7.59 g/cm³.

Thereafter, sintering tests were conducted with the higher heating rates of 5 and 10° C./min and without a hold stage at 600° C. Even under these severe conditions, it was possible to obtain, from the brown parts of examples 1 to 4, impeccable sintered parts with sinter densities of at least 7.59 g/cm³ from the residual binder-free powder molding.

The powder moldings composed of molding composition 5 obtained by the two-stage, slower debindering according to examples 5a and 5b (example 5a acetone, example 5b water) were sintered in a 30 l sinter furnace with molybdenum lining and molybdenum sinter elements under hydrogen. The sintering curve was as follows:
  room temperature to 1280° C. at 5° C./min
  hold time at 1380° C.: 1 h
  cooling at 5° C./min to 1000° C.
  oven off, natural cooling In the case of the moldings according to example 5 too, it was possible without any problem to work with the faster sintering program. The resulting sintered parts attained a good sinter density of 7.68 g/cm³.

The powder moldings of example 6 obtained after the two-stage debindering were sintered in a commercial ceramic sinter furnace in air. The sintering curve was as follows, likewise without hold stages:
  room temperature to 1500° C. at 5° C./min
  hold time at 1500° C.: 1 h
  cooling at 5° C./min to 1000° C.
  oven off, natural cooling The resulting sintered parts were fully intact and fault-free, and had a good sinter density of 6.05 g/cm³.

Examples 1 to 6 show that it is possible to produce intact sintered parts without the presence of a residual binder. By virtue of the fact that it is now possible to dispense with the slow burnout programs which are otherwise customary, a significantly shorter sinter cycle can be achieved.

Examples 7 and 8 which follow describe a process variant suitable especially for reactive powders.

COMPARATIVE EXAMPLE 1

Molding composition 7 had the following composition:

54% by volume of a mixture of 97% by weight of
  aluminum powder and 3% by weight of magnesium powder,
    both with a mean particle size of 18 μm
46% by volume of binder comprising
  + 87% by weight of polyoxymethylene containing 2 mol %
    of 1,3-dioxepane + 13% by weight of an ethoxylated
      $C_{13}$-$C_{15}$-oxo alcohol with 7 ethylene oxide units This molding composition was used to produce tensile specimens to ISO 2740 on an injection molding machine.

The tensile specimens were debindered in a conventional catalytic manner in a 50 l furnace with 4% by volume of $HNO_3$ in 500 l/h of nitrogen (technical-grade purity) at 140° C. over 10 h. After the debindering, small, bead-like growths were found on the surface of the debindered tensile specimens, which had probably formed as a result of reaction of the magnesium with $HNO_3$.

EXAMPLE 7

The same tensile specimens of molding composition 7 were preliminarily debindered in boiling acetone under reflux for 24 h to leach out the ethoxylated fatty alcohol. After 24 h, 92% of the ethoxylated fatty alcohol had been removed.

This was followed by catalytic debindering using 80 g of anhydrous oxalic acid on a sublimation dish at 140° C. over 24 h. After this two-stage debindering, no growths were found on the surface of the debindered tensile specimens.

This was followed by the sintering of the brown parts of molding composition 7 with the following program:
  room temperature to 420° C. at 3° C./min in oxygen
  hold time at 420° C.: 1 h, then switched to nitrogen (dew point −50° C.)
  420° C. to 665° C. at 3° C./min
  hold time at 665° C.: 1 h
  cooling at 5° C./min to 400° C.
  oven off, natural cooling.

The following analysis results are obtained for the sintered part (table 3):

TABLE 3

| Sintered part | Comparative example 1 | Example 7 |
| --- | --- | --- |
| Sinter density | 2.36 g/cm³ | 2.42 g/cm³ |
| Carbon content | 0.045% | 0.039% |
| Oxygen content | 0.30% | 0.24% |

The sintered parts of comparative example 1, as a result of the growths, had a much rougher surface than the sintered parts according to example 7. In addition, the sintered parts obtained according to example 7 have a reduced carbon and oxygen content and a higher sinter density compared to the sintered parts from comparative example 1. As a result, it is possible to produce less brittle materials which are easier to process from the sintered parts produced according to example 7.

COMPARATIVE EXAMPLE 2

Molding composition 8 had the following composition:

64% by volume of a grade 2 titanium powder
  (DIN 17862 – 3.7035) with a mean particle size of 25 μm
36% by volume of binder comprising
  + 90% by weight of polyoxymethylene with
    2 mol % of 1,3-dioxepane + 10% by weight of
      poly-1,3-dioxolane with a molar mass of 35000

This molding composition was used to produce tensile specimens according to ISO 2740 by an injection molding machine.

The tensile specimens were debindered in a conventional catalytic manner in a 50 l furnace with 4% by volume of $HNO_3$ in 500 l/h of nitrogen (technical-grade purity) at 140° C. over 6 h.

The same tensile specimens of molding composition 8 were preliminarily debindered in boiling acetone under reflux for 24 h. After 24 h, 84% of the poly-1,3-dioxolane had been removed. Thereafter, the tensile specimens, as described in example 7, were catalytically debindered with oxalic acid and sintered with the following program under 5.0 quality argon:
room temperature to 600° C. at 3° C./min
hold time at 600° C.: 1 h
600° C. to 1200° C. at 5° C./min
hold time at 1200° C.: 1 h
cooling at 5° C./min to 1000° C.
oven off, natural cooling The following analysis results are obtained for the sintered part (table 4):

TABLE 4

| Sintered part | Comparative example 2 | Example 8 | DIN 17862 3.7065 | DIN 17862 3.7035 |
|---|---|---|---|---|
| Sinter density | 4.29 g/cm³ | 4.33 g/cm³ | — | — |
| Nitrogen content | 0.035% | 0.037% | 0.07% max. | 0.05% max. |
| Carbon content | 0.15% | 0.06% | 0.10% max. | 0.06% max. |
| Oxygen content | 0.25% | 0.20% | 0.30% max. | 0.20% max. |

CONCLUSION

The sintered parts obtained in accordance with the invention according to example 8 have a reduced carbon and oxygen content and a higher sinter density compared to the sintered parts from comparative example 2. The sintered part obtained according to comparative example 2 in terms of the elements C and O meets only the DIN 3.7065 standard, whereas the sintered part obtained in accordance with the invention according to example 8 still satisfies the much stricter standard DIN 3.7035.

As a result, it is possible to produce less brittle materials which are easier to process from the sintered parts produced according to example 8.

The invention claimed is:

1. A process for producing a metallic or ceramic shaped body from a thermoplastic material comprising
    A) 40 to 65% by volume of at least one inorganic sinterable powder A
    B) 35 to 60% by volume of a mixture of
        $B_1$) 50 to 95% by weight of one or more polyoxymethylene homo- or copolymers;
        $B_2$) 5 to 50% by weight of a polymer homogeneously dissolved in $B_1$) or dispersed in $B_1$) with a mean particle size of less than 1 μm,
        as a binder, and
    C) 0 to 5% by volume of a dispersing aid,
    where the sum of components A), B) and C) adds up to 100% by volume,
    by injection molding or extrusion to give a green body, removing the binder and sintering, which comprises removing the binder by
    a) treating the molding with a solvent which extracts the binder component $B_2$) from the molding and in which the binder component $B_1$) is insoluble,
    b) then removing the solvent from the molding by drying, and
    c) then treating the molding in an acid-containing atmosphere which removes the binder component $B_1$ from the molding, wherein the molding is treated in an acid-containing atmosphere until the residual binder content in the molding is less than 0.2% by weight.

2. The process according to claim 1, wherein acids which are solid at room temperature and sublime or melt and evaporate at higher temperatures are used in step c).

3. The process according to claim 1, wherein an anhydrous oxalic acid is used in step c).

4. The process according to claim 1, wherein step a) is conducted at a temperature above RT up to the boiling temperature of the solvent.

5. The process according to claim 1, wherein the inorganic sinterable powder A) used is a reactive and/or oxidation-sensitive powder.

6. The process according to claim 1, wherein the proportion of the binder component $B_2$) is 10 to 30% by weight.

7. The process according to claim 1, wherein the binder component $B_2$) is selected from the group consisting of: polyolefins, aliphatic polyurethanes, aliphatic uncrosslinked polyepoxides, polyethers, aliphatic polyamides and polyacrylates, and mixtures thereof.

8. The process according to claim 1, wherein the binder component $B_2$) is a polyether selected from the group consisting of polyethylene oxide, polypropylene oxide, poly-1, 3-dioxepane, poly-1,3-dioxane, poly-1,3-dioxolane, polytetrahydrofuran (poly(tetramethylene) oxide) and mixtures thereof.

9. A process for producing a metallic or ceramic shaped body from a thermoplastic material comprising
    A) 40 to 65% by volume of at least one inorganic sinterable powder A
    B) 35 to 60% by volume of a mixture consisting of
        $B_1$) 50 to 95% by weight of one or more polyoxymethylene homo- or copolymers;
        $B_2$) 5 to 50% by weight of a polymer selected from the group consisting of: aliphatic polyurethanes, aliphatic uncrosslinked polyepoxides, polyethers, aliphatic polyamides and polyacrylates, and mixtures thereof homogeneously dissolved in $B_1$) or dispersed in $B_1$) with a mean particle size of less than 1 μm,
        as a binder, and
    C) 0 to 5% by volume of a dispersing aid,
    where the sum of components A), B) and C) adds up to 100% by volume, by injection molding or extrusion to give a green body, removing the binder and sintering, which comprises removing the binder by
    a) treating the molding with a solvent which extracts the binder component $B_2$) from the molding and in which the binder component $B_1$) is insoluble,
    b) then removing the solvent from the molding by drying, and
    c) then treating the molding in an acid-containing atmosphere which removes the binder component $B_1$ from the molding, wherein the molding is treated in an acid-containing atmosphere until the residual binder content in the molding is less than 0.2% by weight.

* * * * *